US010381847B2

United States Patent
Jin et al.

(10) Patent No.: US 10,381,847 B2
(45) Date of Patent: Aug. 13, 2019

(54) BATTERY PACK AND VACUUM CLEANER INCLUDING THE SAME

(71) Applicant: Samsung SDI Co., Ltd., Yongin-si, Gyeonggi-do (KR)

(72) Inventors: Kyongpil Jin, Yongin-si (KR); Myungsang Lee, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 0 days.

(21) Appl. No.: 15/724,032

(22) Filed: Oct. 3, 2017

(65) Prior Publication Data

US 2018/0131205 A1 May 10, 2018

(30) Foreign Application Priority Data

Nov. 7, 2016 (KR) .................. 10-2016-0147632

(51) Int. Cl.
*A47L 9/00* (2006.01)
*A47L 9/28* (2006.01)
*H02J 7/00* (2006.01)
*G05B 11/28* (2006.01)

(52) U.S. Cl.
CPC .............. *H02J 7/0029* (2013.01); *A47L 9/00* (2013.01); *A47L 9/2805* (2013.01); *A47L 9/2836* (2013.01); *A47L 9/2884* (2013.01); *A47L 9/2889* (2013.01); *A47L 9/2894* (2013.01);
(Continued)

(58) Field of Classification Search
CPC ...... H02P 1/00; H02P 6/00; H02P 1/46; H02P 3/18; H02P 27/04; H02P 27/06; H02P 41/00; H02P 23/00; H02P 27/00; G05B 11/28; H02J 7/00; H02J 7/04

USPC ........ 318/400.01, 599, 700, 701, 727, 799, 318/800, 801, 430, 139; 361/23;
(Continued)

(56) References Cited

U.S. PATENT DOCUMENTS 4,835,409 A * 5/1989 Bhagwat ............... A47L 9/2805
15/DIG. 1
6,850,039 B2 * 2/2005 Popescu ............ H01M 10/4257
320/134
(Continued)

FOREIGN PATENT DOCUMENTS

JP         8-275383 A      10/1996
JP      2011-254650 A      12/2011
WO   WO 2008/009827 A2     1/2008

OTHER PUBLICATIONS

EPO Extended Search Report dated Mar. 6, 2018, for corresponding European Patent Application No. 17200441.8 (7 pages).

*Primary Examiner* — Antony M Paul
(74) *Attorney, Agent, or Firm* — Lewis Roca Rothgerber Christie LLP

(57) ABSTRACT

A battery pack includes a battery including at least one battery cell, a terminal portion electrically connected to the battery and including a first pack terminal connected to an external load and a second pack terminal, a first switch configured to switch a discharge current of the battery according to a first control signal, a second switch configured to open or close according to a second control signal, and to open the first switch that is turned on by the first control signal, by a voltage of the first pack terminal or the second pack terminal, and a battery manager configured to output the first control signal and the second control signal.

9 Claims, 3 Drawing Sheets

(52) U.S. Cl.
CPC .......... *H02J 7/0031* (2013.01); *H02J 7/0068* (2013.01); *H02J 2007/0039* (2013.01)

(58) Field of Classification Search
USPC ....... 363/21.1; 320/113, 116, 127, 166, 145; 15/246.2
See application file for complete search history.

(56) References Cited

U.S. PATENT DOCUMENTS

| | | | | |
|---|---|---|---|---|
| 7,456,614 | B2* | 11/2008 | Sato | H02H 7/18 |
| | | | | 320/127 |
| 8,174,237 | B2* | 5/2012 | Kosugi | B60L 3/0046 |
| | | | | 320/116 |
| 8,232,773 | B2* | 7/2012 | Denning | H02J 7/0075 |
| | | | | 320/116 |
| 8,331,119 | B2* | 12/2012 | Plaideau | H02J 7/0031 |
| | | | | 323/266 |
| 2010/0045257 | A1 | 2/2010 | Plaideau et al. | |
| 2010/0253285 | A1* | 10/2010 | Takahashi | H02J 7/0006 |
| | | | | 320/118 |
| 2011/0023264 | A1* | 2/2011 | Liebig | A47L 9/2805 |
| | | | | 15/412 |
| 2011/0068735 | A1 | 3/2011 | Nicholson et al. | |
| 2013/0181681 | A1* | 7/2013 | Mukai | H02J 7/0031 |
| | | | | 320/134 |
| 2013/0187468 | A1* | 7/2013 | Kim | H02J 1/10 |
| | | | | 307/65 |
| 2016/0172933 | A1* | 6/2016 | Strouse | H02K 7/145 |
| | | | | 310/50 |
| 2016/0344205 | A1* | 11/2016 | Abe | H01M 10/4257 |
| 2017/0027400 | A1* | 2/2017 | Lee | A47L 5/362 |
| 2017/0254858 | A1* | 9/2017 | Weicker | G01R 31/3648 |

* cited by examiner

BATTERY PACK AND VACUUM CLEANER INCLUDING THE SAME

CROSS-REFERENCE TO RELATED APPLICATION

This application claims priority to and the benefit of Korean Patent Application No. 10-2016-0147632, filed on Nov. 7, 2016, in the Korean Intellectual Property Office, the disclosure of which is incorporated herein in its entirety by reference.

BACKGROUND

1. Field

Aspects of the present disclosure relate to a battery pack and a vacuum cleaner including the same.

2. Description of the Related Art

As portable electronic devices, such as mobile phones, digital cameras, notebook computers, and the like, are widely used, batteries for supplying power to operate these portable electronic devices have been actively developed. A battery is provided in the form of a battery pack with a protection integrated circuit (IC) for controlling charge and discharge of a battery. Various studies about charge methods and apparatuses to efficiently charge a battery have been performed.

A battery may include a charge switch and a discharge switch. When a battery needs protection due to overcharge or overdischarge of the battery, at least one of the charge switch and the discharge switch is turned off. When a battery does not need to be protected, the charge switch and the discharge switch are continuously turned on to charge or discharge the battery.

When power is applied from a battery pack to a motor included in power tools or vacuum cleaners requiring a large amount of power, in order to stably drive the motor, a high capacity capacitor is generally provided at opposite ends of the battery pack. In this case, at a moment when the capacitor and the battery pack are electrically connected to operate the motor, a large inrush current flowing into the capacitor is generated in the battery pack, and thus a protection device of the battery pack may be damaged due to the flow of the inrush current.

SUMMARY

Additional aspects will be set forth in part in the description which follows and, in part, will be apparent from the description, or may be learned by practice of the presented embodiments.

According to one or more embodiments, there is provided a battery pack including: a battery including at least one battery cell; a terminal portion electrically connected to the battery and including a first pack terminal connected to an external load and a second pack terminal; a first switch configured to switch a discharge current of the battery according to a first control signal; a second switch configured to open or close according to a second control signal, and to open the first switch that is turned on by the first control signal, by a voltage of the first pack terminal or the second pack terminal; and a battery manager configured to output the first control signal and the second control signal.

In some embodiments, the battery manager is configured to output, as the second control signal, a pulse width modulation signal having a pulse width varying according to a duty cycle.

In some embodiments, the battery manager is configured to limit an amount of a discharge current of the battery by outputting the second control signal having a preset first duty cycle at a discharge start point when discharge starts.

In some embodiments, the discharge start point is a point in time when an electric connection of the external load is sensed between the first pack terminal and the second pack terminal, or when the external load is electrically connected between the first pack terminal and the second pack terminal according to a start signal applied from the outside.

In some embodiments, the battery manager is configured to output the second control signal having the first duty cycle and to then reduce the duty cycle of the second control signal.

In some embodiments, the battery manager includes: a protection integrated circuit (IC) configured to sense a voltage of the battery and to output the first control signal; and a micro-controller configured to output the second control signal.

According to one or more embodiments, there is provided a vacuum cleaner including: a battery pack; a capacitor electrically connected to the battery pack; and a motor connected in parallel to the capacitor, wherein the battery pack includes: a battery including at least one battery cell; a first pack terminal and a second pack terminal electrically connected to the battery, and electrically connected to the capacitor and the motor; a first switch configured to switch a discharge current of the battery according to a first control signal; a second switch configured to open or close according to a second control signal, and to open the first switch that is turned on by the first control signal, by a voltage of the first pack terminal or the second pack terminal; and a battery manager configured to output the first control signal and the second control signal.

In some embodiments, the battery manager is configured to output, as the second control signal, a pulse width modulation signal having a pulse width varying according to a duty cycle.

In some embodiments, the battery manager is configured to reduce an amount of an inrush current that is a current initially flowing into the capacitor, by outputting the second control signal having a preset first duty cycle at a discharge start point when the battery starts discharging.

In some embodiments, the battery manager is configured to output the second control signal having the first duty cycle and then to gradually reduce the duty cycle of the second control signal.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

The present inventive concept is described in detail with reference to the accompanying drawings. However, the present inventive concept is not limited thereto and it will be understood that various changes in form and details may be made therein without departing from the spirit and scope of the following claims. That is, descriptions on particular structures or functions may be presented merely for explaining embodiments of the present inventive concept.

Unless defined otherwise, all terms used herein including technical or scientific terms have the same meanings as those generally understood by those of ordinary skill in the art to which the present inventive concept may pertain. The terms as those defined in generally used dictionaries are construed to have meanings matching that in the context of related technology and, unless clearly defined otherwise, are not construed to be ideally or excessively formal.

Figure 1:
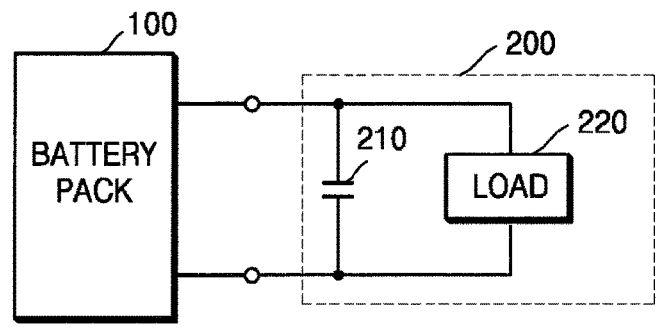
FIG. 1 is a schematic block diagram of a connection structure of a battery pack and an external load, according to an embodiment of the present disclosure.

FIG. 1 is a schematic block diagram of a connection structure of a battery pack 100 and an external load 200, according to an embodiment of the present disclosure.

Referring to FIG. 1, the external load 200 may include a load 220 and a capacitor 210 that are connected in parallel to the battery pack 100 to provide stable power to the load 220.

The battery pack 100 may receive and store power from an external system and supply the stored power to the load 220. The battery pack 100 may include a protection switch that is open when an overcurrent flows inside to prevent a battery cell or a protection device included in the battery pack 100 from being damaged or from exploding due to the overcurrent.

The load 220 may consume the power stored in the battery pack 100 by receiving the power stored in a battery 110 and the capacitor 210. The load 220 may be an apparatus including a motor, such as in an electric vacuum cleaner or a power tool. The load 220 may rotate the motor by receiving the power stored in the battery pack 100.

The capacitor 210 is arranged between the battery pack 100 and the load 220 to stably supply the power of the battery pack 100 to the load 220. The capacitor 210 may stabilize a voltage of the battery pack 100 so that the voltage of the battery pack 100 may be applied to the load 220 as a constant value. For example, the capacitor 210 may absorb noise generated from the motor. Furthermore, when connected to an inductor load 220 such as the motor, the capacitor 210 may compensate for a power factor.

The battery pack 100, when electrically connected to the capacitor 210, is discharged to charge the capacitor 210. When the charge of the capacitor 210 is completed, the load 220 starts, or is driven, to operate. A time spent until the operation of the load 220 starts after the charge of the capacitor 210 starts is referred to as a start delay time. For example, the start delay time is a time after an application of a start signal in a vacuum cleaner or a power tool until a motor included in the vacuum cleaner or the power tool is driven.

If no separate resistance element exists between the battery pack 100 and the capacitor 210 when the battery pack 100 is electrically connected to the capacitor 210 in response to the start signal (hereinafter, referred to as a discharge start point), the battery pack 100 discharges a relatively large current to charge the capacitor 210. The current flowing in the capacitor at the discharge start point may be referred to as an inrush current. In detail, the amount of current discharged by the battery pack 100 to charge the capacitor 210 may be determined by a difference between the voltage of the battery pack 100 and a voltage of the capacitor 210, resistance of a wire between the capacitor 210 and the battery pack 100, and an internal resistance of the battery pack 100. In other words, the amount of current to charge the capacitor 210 is a value obtained by dividing a value obtained by subtracting the voltage of the capacitor 210 from the voltage of the battery pack 100 by a value obtained by summing the resistance of the wire and the internal resistance of the battery pack 100. A voltage between opposite ends of the capacitor 210 when the battery pack 100 starts to charge the capacitor 210 is around 0 V. For example, when the voltage of the battery pack 100 is 37.8 V, the voltage before the capacitor 210 is charged is 0 V, and the sum of the internal resistance and the wire resistance is 150 mΩ, the amount of a discharge current (or an inrush current) when the charge of the capacitor 210 starts is 37.8/015 that is about 252 A.

The discharge start point is a point in time when the battery pack 100 and the capacitor 210 are electrically connected to each other by receiving a start signal from the outside. In response to the start signal, a separate switching device included in the battery pack 100 or a separate switching device included in the external load 200 is turned on, and thus the battery pack 100 and the capacitor 210 may be electrically connected to each other, or as a first switch 130 of the battery pack 100 is turned on, the battery pack 100 and the capacitor 210 may be electrically connected to each other.

As such, the amount of inrush current flowing into the capacitor 210 as the battery pack 100 is discharged at a point when the charge of the capacitor 210 starts. If the amount of inrush current is not limited, a fuse or a relay that is a protection device of the battery pack 100 may be abnormally opened, and thus power may not be normally supplied to the load 220.

In consideration of the above matters, the battery pack 100 may form a separate path including a resistor and a switch to limit the inrush current that is an initial charge current of the capacitor 210. In this case, the battery pack 100 may include a resistor and a high performance FET switch. Even when the capacitor 210 is charged and a difference between the voltage between the opposite ends of the capacitor 210 and the voltage of the battery pack 100 (hereinafter, referred to as the inrush voltage) decreases, the capacitor 210 is charged by a current value by the resistance device. In other words, as the charging of the capacitor 210 progresses, an amount of a discharge current to charge the capacitor 210 gradually decreases. In this viewpoint, forming a separate path may considerably delay a time to fully charge the capacitor 210, and also a delay time that is a time spent from the discharge start point to the operation of the load 220 may prolong, which is inefficient. Accordingly, while the amount of the inrush current flowing into the capacitor 210 is limited, a new method of reducing the delay time of the load 220 is needed and described below in further detail.

Figure 2:
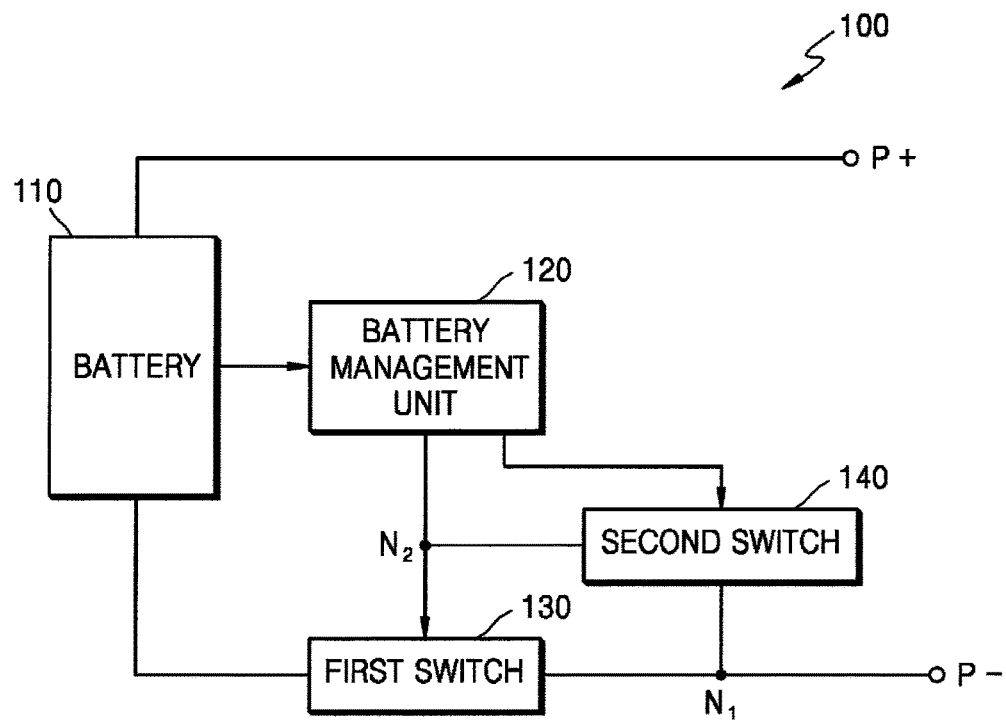
FIG. 2 is a schematic block diagram of an internal structure of a battery pack according to an embodiment of the present disclosure.

FIG. 2 is a schematic block diagram of an internal structure of a battery pack according to an embodiment of the present disclosure.

Referring to FIG. 2, the battery pack 100 may include the battery 110, a battery management unit (e.g., battery manager) 120, a first pack terminal P+, a second pack terminal P−, the first switch 130, and a second switch 140.

The battery 110 is a component for storing power and may include at least one battery cell 113. The battery 110 may include a plurality of battery cells 113, and the battery cells 113 may be connected to one another serially, in parallel, or in a serial-parallel combination. The number and connection method of the battery cells 113 included in the battery 110 may be determined according to the desired output voltage and power storage capacity.

The battery cell 113 may include a chargeable secondary battery. For example, the battery cell 113 may include a nickel-cadmium battery, a lead storage battery, a nickel metal hydride battery (NiMH), a lithium ion battery, a lithium polymer battery, and the like, but the present disclosure is not limited thereto.

The battery management unit 120 is connected to the battery 110, and may control charge and discharge operations of the battery 110. The battery management unit 120 may monitor the voltage, current, temperature, residual power, lifespan, charge status, and/or the like of the battery 110. The battery management unit 120 may detect a situation in which the battery 110 exceeds a preset voltage or a preset current amount so that the battery 110 is likely to be damaged, and opens the first switch 130 to protect the battery 110. In other words, the battery management unit 120 may perform an overcharge protection function, an over-discharge protection function, an overcurrent protection function, an overvoltage protection function, an overheat protection function, and/or the like of the battery 110.

The first pack terminal P+ may be electrically connected to the positive terminal (i.e., cathode) of the battery, and the second pack terminal P− may be electrically connected to the negative terminal (i.e., anode) of the battery 110. The first pack terminal P+ and the second pack terminal P− may be electrically connected to an external apparatus to supply the power of the battery pack 100 externally to the load 220 or to receive power from the outside. For example, the first pack terminal P+ and the second pack terminal P− may be formed in wiring patterns, such as electrodes, connectors, lands, or pads, for the electric connection to the external apparatus.

The first switch 130 is arranged between the battery 110 and the second pack terminal P−. The first switch 130 may receive a first control signal CS1 from the battery management unit 120 to switch current to charge and discharge the battery 110. The first switch 130 may include a relay or a FET switch.

For convenience of explanation, it is assumed that the first switch 130 is turned off when a low level voltage is applied as a control signal and turned on when a high level voltage is applied as a control signal.

The second switch 140 is electrically connected between a second node N2 that is a node where the battery management unit 120 and the first switch 130 are electrically connected and a first node N1 that is a node between the second pack terminal P− and the first switch 130 or between the battery 110 and the first switch 130. The second switch 140 may forcibly turn off the first switch 130 by applying a voltage of the first node N1 (i.e., a voltage of the second pack terminal) to the second node N2. For example, when the first switch 130 is turned off as the first control signal CS1 is shifted from a high level voltage signal to a low level voltage signal, and the second switch 140 is turned on as the second pack terminal P− connected to a negative terminal of the battery 110 has a low level voltage, a voltage corresponding to the low level voltage signal applied to the second pack terminal P− is supplied as the second node N2. In this case, even when the battery management unit 120 outputs the first control signal CS1 having a high level voltage, the first switch 130 is turned off as a low level signal is forcibly applied as a control signal due to the turn-on of the second switch 140. In other words, the second switch 140 may forcibly turn off the first switch 130 by the voltage of the first node N1.

According to an embodiment, the battery management unit 120 may open or close the first switch 130 by applying a second control signal CS2, independent of the first control signal CS1, to the second switch 140. The second control signal CS2 may be a pulse width modulation (PWM) signal having a pulse width that is modulated according to a duty cycle. The second switch 140 cyclically repeats turning on/off according to the pulse width modulation signal. When the second switch 140 is turned on, a low level voltage is applied as a control signal of the first switch 130 and thus the first switch 130 is forcibly turned off. The first switch 130 is turned on only when the second switch 140 is turned off and thus a discharge current of the battery 110 may flow to the second pack terminal P−. In this method, the amount of the discharge current of the battery 110 may be controlled.

According to an embodiment, while the battery management unit 120 continuously outputs the first control signal CS1 to turn on the first switch 130 to the first switch 130, it may turn off the first switch 130 by outputting the second control signal CS2 to turn on the second switch 140. For example, when a situation to protect the battery 110 occurs during the adjustment of the amount of the discharge current of the battery 110, the battery management unit 120 may turn off the first switch 130 by outputting the first control signal CS1 of a low level voltage to the first switch 130, independently of outputting the second control signal CS2. For example, when the battery 110 is exposed to a high temperature so that discharge needs to be stopped, the battery management unit 120 outputting the second control signal CS2 may output a low level voltage signal as the first control signal CS1, thereby opening the first switch 130. In this case, the first control signal CS1 has a low level voltage and, even when the second switch 140 is turned off in response to the second control signal CS2, the first switch 130 maintains a turned-off state as the low level voltage of the first control signal CS1 is continuously applied thereto. In other words, the battery management unit 120 may control the second switch 140, thereby protecting the battery 110 in response to the first control signal CS1 and controlling the amount of the discharge current of the battery 110.

Figure 3:
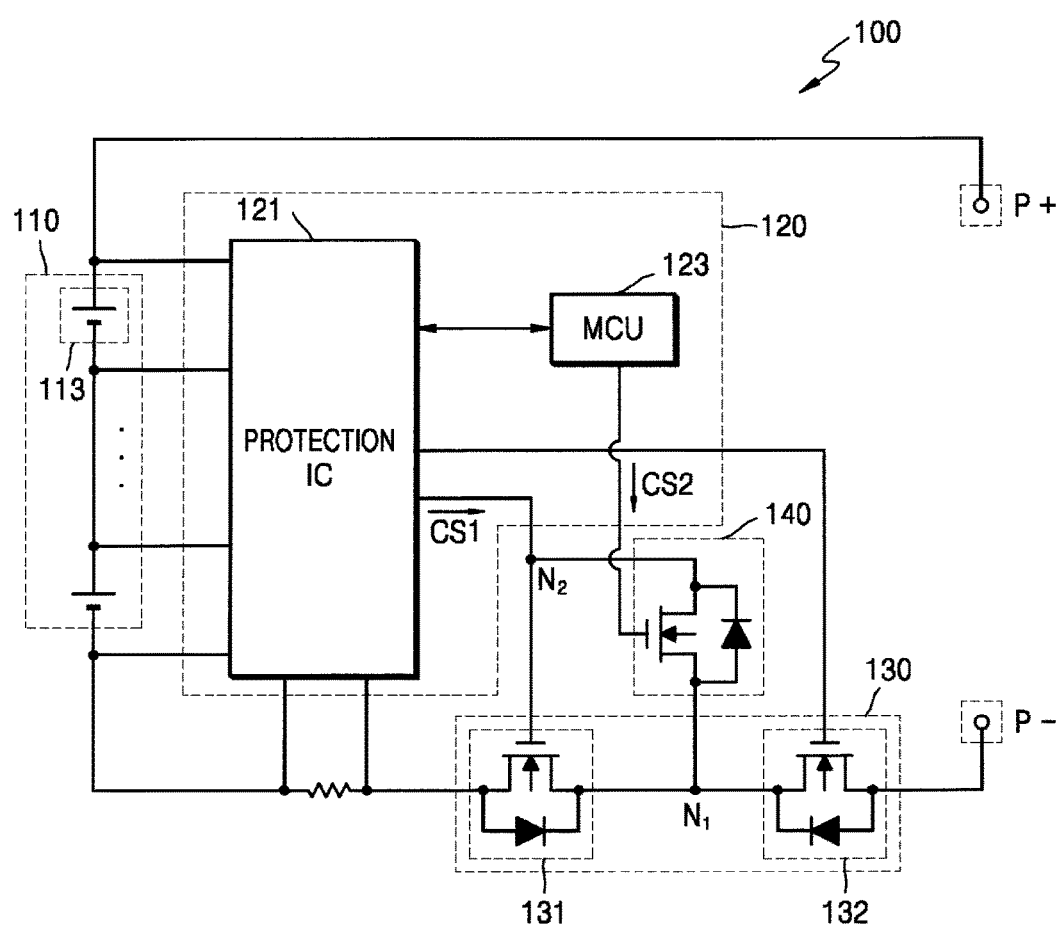
FIG. 3 is a schematic block diagram of an internal structure of a battery pack according to an embodiment of the present disclosure.

FIG. 3 is a schematic block diagram of an internal structure of a battery pack according to an embodiment of the present disclosure.

Referring to FIG. 3, the battery management unit 120 may include a protection integrated circuit (IC) 121 and a micro-control unit (MCU, also referred to as a micro-controller) 123. The first switch 130 may include a charge switch 132 and a discharge switch 131.

In the following description, when a low level voltage signal is applied as a control signal to the discharge switch 131 of the first switch 130, the discharge switch 131 is turned off, and the second pack terminal P− is electrically connected to the negative terminal of the battery 110.

The protection IC 121 may monitor a voltage, a current, a temperature, a charge state, and/or the like of each of the battery cells 113. The protection IC 121 may transfer information about the monitored voltage, current, temperature, charge state, and/or the like of the battery cells 113 to the micro-control unit 123, and may operate the charge switch 132 and the discharge switch 131 under the control of the micro-control unit 123.

The micro-control unit 123 is an integrated circuit (IC) electrically connected to the protection IC 121, and may analyze a state of the battery 110 based on the voltage, current, temperature, charge state, and/or the like of the battery cell 113 received via the protection IC 121. The micro-control unit 123 turns on/off the charge switch 132 and the discharge switch 131 by outputting a control signal corresponding to the state of the battery 110 to the protection IC 121.

The micro-control unit 123 may generate a PWM signal. The micro-control unit 123 may output the PWM signal as the second control signal CS2 to be applied to the second switch 140. The second switch 140 may repeatedly (e.g., cyclically) turn-on/off in response to the applied PWM signal. The micro-control unit 123 may adjust a turn-on ratio of the second switch 140 by controlling a duty cycle of the PWM signal.

The charge switch 132 and the discharge switch 131 may include a MOSFET. A drain and a source of the charge switch 132 may be arranged on a high current path of the battery 110. It is assumed that one of a drain and a source of the discharge switch 131 is a first electrode and the other is a second electrode. The first electrode and the second electrode of the discharge switch 131 are arranged on the high current path of the battery 110. A gate of the discharge switch 131 (hereinafter, referred to as a first control electrode) is electrically connected to the protection IC 121, and the first control signal is applied to the gate.

A parasitic diode of the charge switch 132 is arranged such that a direction in which the discharge current of the battery 110 flows represents a forward bias direction of the parasitic diode. When the charge switch 132 is turned off, a charge current of the battery 110 is cut off. A parasitic diode of the discharge switch 131 is arranged such that a direction in which the charge current of the battery 110 flows represents a forward bias direction of the parasitic diode. When the discharge switch 131 is turned off, the discharge current of the battery 110 is cut off. The discharge switch 131 is electrically connected to the negative terminal of the battery 110. In this case, the discharge switch 131 may include an N-type MOSFET.

The second switch 140 is connected between the first control electrode and any one of the first electrode and the second electrode. A second control electrode that is a control electrode of the second switch 140 is electrically connected to the micro-control unit 123. Assuming that any one of a drain and a source of the second switch 140 is a third electrode and the other is a fourth electrode, and that an electrode connected to any one electrode of the first electrode and the second electrode is the third electrode and an electrode electrically connected to the first control electrode is the fourth electrode, each of the third electrode and fourth electrode corresponds to any one of a drain and a source of the second switch 140. The second switch 140 in FIG. 2 is an N-type MOSFET and may be turned off when the second control signal CS2 is a low level and turned on when the second control signal CS2 is a high level. In some examples, the second switch 140 may include a P-type MOSFET rather than an N-type MOSFET. However, for convenience of explanation, the following description is based on an assumption that the second switch 140 includes an N-type MOSFET.

According to an embodiment, when the second switch 140 is turned on, the third electrode and the fourth electrode are electrically connected and thus the voltage of the second pack terminal P− is applied to the first control electrode. In this case, the voltage of the second pack terminal P− is a low level voltage and is applied to the first control electrode as a low level voltage. Even when the first control signal of a high level voltage signal is applied to the first switch 130, the second switch 140 short-circuits the first node N1 and the second node N2 as described above with reference to FIG. 2, and thus a lower level signal is forcibly applied to the first control electrode. In this case, the first switch 130 is turned off, and thus a current flow between the first electrode and the second electrode is cut off.

According to an embodiment, the micro-control unit 123 may control the discharge time of the battery 110 by adjusting the duty cycle of the PWM signal. For example, the second switch 140 repeatedly turns-on and turns-off in response to the PWM signal of the second control signal CS2. Accordingly, when the second switch 140 is turned on, the voltage of the second pack terminal P− is applied to the first control electrode, and thus the discharge switch 131 is turned off. When the second switch 140 is turned off, a high level voltage in response to the first control signal CS1 is applied to the first control electrode, and thus the discharge switch 131 is turned on. In the above method, the micro-control unit 123 controls the second switch 140 to forcibly turn off the discharge switch 131 according to the duty cycle. In other words, the micro-control unit 123 may adjust a turn-on rate of the discharge switch 131 by controlling the duty cycle. In this case, a proportion of the battery 110 being discharged per unit time may be controlled, and the amount of a discharge current per unit time may be adjusted by the duty cycle. When the battery 110 is exposed to a dangerous situation, the protection IC 121 applies a low level voltage signal as the first control signal to the discharge switch 131. In this case, even if the second switch 140 repeatedly turns-on and turns-off, the turned-off state of the discharge switch 131 is maintained.

According to an embodiment, the micro-control unit 123 may output the second control signal CS2 having a first duty cycle to the discharge start point. The discharge start point is a point in time when an electrical connection of the capacitor 210 between the first pack terminal P+ and the second pack terminal P− is sensed or the capacitor 210 is electrically connected between the first pack terminal P+ and the second pack terminal P− in response to the start signal applied from the outside. When no separate resistant element exists between the capacitor 210 and the first pack terminal P+ and the second pack terminal P− at the discharge start point, a large inrush current may be generated. The micro-control unit 123 may reduce the amount of the inrush current by setting the first duty cycle to a large value to lower the turn-on rate per unit time of the discharge switch 131. The first duty cycle may be set based on the amount of an open discharge current of the protection devices included in the battery pack 100. For example, when a discharge current over 50 A flows, the protection devices are opened, and when the amount of the inrush current is about 200 A while the discharge switch 131 maintains a turned-on state, the first duty cycle is set to have a value over 80%. In this case, the battery pack 100 may limit the amount of the inrush current to be less than 50 A.

After the discharge start point, the capacitor 210 is charged by receiving power from the battery 110, and the voltage between the opposite ends of the capacitor 210 increases. In this case, the amount of the inrush voltage that is a difference between the voltage between the opposite ends of the capacitor 210 and the voltage between the first pack terminal P+ and the second pack terminal P− decreases, and the amount of the discharge current of the battery 110 flowing into the capacitor 210 decreases as well. In this case, even when the micro-control unit 123 decreases the duty cycle of the second control signal CS2, a discharge current that is lower than or equal to a current value at which the protection device is opened (hereinafter, referred to as the allowable current) may be controlled to flow.

According to an embodiment, the micro-control unit 123 may output the second control signal CS2 having the first duty cycle at the discharge start point and then gradually decrease the duty cycle. In this case, furthermore, when the duty cycle of the second control signal CS2 decreases, the turn-on rate of the first switch 130 increases, and thus the capacitor 210 may be fully charged at a relatively faster speed. In other words, the micro-control unit 123 outputs the second control signal CS2 having the first duty cycle to control the inrush current to be less than the allowable current, and then decreases the duty cycle of the second control signal CS2 to increase a charge time of the capacitor 210, thereby fully charging the capacitor 210 more rapidly.

Figure 4:
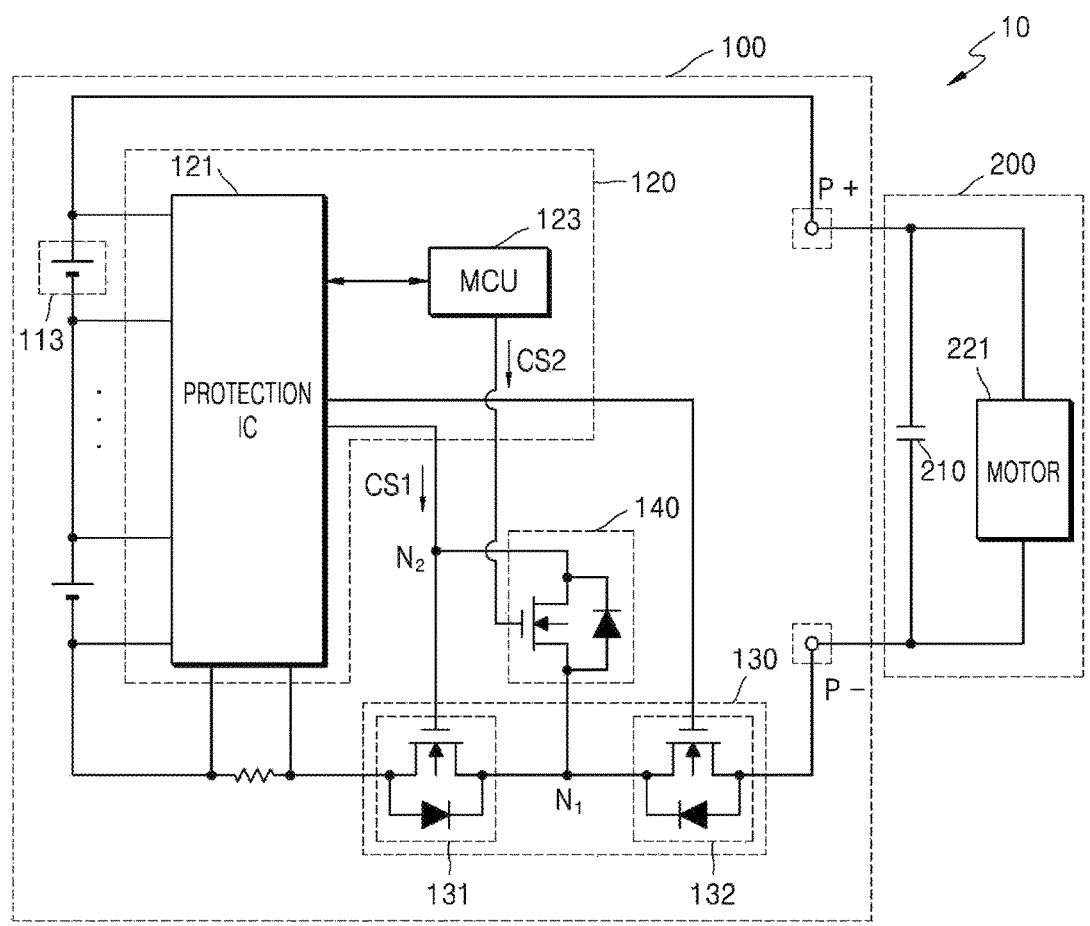
FIG. 4 is a schematic block diagram of an internal structure of a vacuum cleaner according to an embodiment of the present disclosure.

FIG. 4 is a schematic block diagram of an internal structure of a vacuum cleaner 10 according to an embodiment of the present disclosure.

Referring to FIG. 4, the vacuum cleaner 10 may include the battery pack 100, the capacitor 210, and a motor 221. The vacuum cleaner 10 may be driven by a user's input signal. For example, the vacuum cleaner 10 may be driven by receiving a start signal through a switch or button located on an exterior surface. When the start signal is received, the capacitor 210 is electrically connected to the battery pack 100 and receives power from the battery pack 100 to start charging.

In the following description, it is assumed that the discharge switch 131 included in the battery pack 100 is arranged between the negative terminal of the battery 110 and the second pack terminal P− and includes an N-type MOSFET. However, in some example, the discharge switch 131 may include a P-type MOSFET rather than an N-type MOSFET, and those of ordinary skill in the art would know how to connect the circuit.

When receiving a start signal, that is, at a discharge start point, the battery pack 100 starts discharging to charge the capacitor 210 connected between the first pack terminal P+ and the second pack terminal P−. As described above with reference to FIG. 1, if no separate resistance element exists between the capacitor 210 and each of the first pack terminal P+ and the second pack terminal P−, a relatively large inrush current flows into the capacitor 210. When the amount of the inrush current is greater than the allowable current described with reference to FIG. 3, the protection device, such as a fuse or a relay of the battery pack 100, is opened, and thus the vacuum cleaner 10 does not operate properly. Accordingly, the amount of the inrush current needs to be controlled to be lower than the allowable current.

According to an embodiment, the battery pack 100 may limit the amount of the inrush current by outputting a PWM signal having the first duty cycle described with reference to FIG. 3 as the second control signal CS2. For example, when a discharge current over 50 A flows, the protection devices are opened. When the amount of the inrush current is about 200 A, the duty cycle of the second control signal CS2 is set to have a value over 80%. In this case, the battery pack 100 may limit the amount of the inrush current to be a value less than 50 A.

The vacuum cleaner 10 is designed such that the time spent from the discharge start point to the operation of the motor is within the delay time described with reference to FIG. 3. In general, the vacuum cleaner 10 may operate the motor 221 within the delay time by reducing the time for charging the capacitor 210.

According to an embodiment, the battery pack 100 may limit the amount of the inrush current flowing into the capacitor 210 by applying the second control signal CS2 having the first duty cycle to the second switch 140 at the discharge start point, and then decrease the duty cycle of the second control signal CS2. For example, the battery pack 100 may increase the amount of the discharge current applied to the capacitor 210 per unit time by decreasing the duty cycle of the second control signal CS2. For example, the battery pack 100 may gradually decrease the duty cycle as time passes to increase the time to charge the capacitor 210 with the discharge current of the battery 110, that is, an increase of a battery discharge time, thereby reducing the time to fully charge the capacitor 210. In other words, the battery pack 100 may limit the amount of the inrush current to be less than the allowable current by the second control signal CS2 having the first duty cycle at the discharge start point, and then gradually decrease the duty cycle of the second control signal CS2 to rapidly and fully charge the capacitor 210.

Accordingly, in reducing the inrush current, as the battery pack 100 indirectly controls the discharge switch 131 by a pack terminal voltage by applying a PWM signal to the second switch 140 of a low capacity, the discharge switch 131 may be opened or closed with a relatively less control current, as compared to a case of directly controlling the discharge switch 131 by the PWM signal. Furthermore, in consideration that the discharge switch 131 is opened by the voltage of the first pack terminal P−, when a situation in which the battery 110 may be damaged is sensed, it may be guaranteed that the discharge switch 131 is still opened by the first control signal.

It should be understood that embodiments described herein should be considered in a descriptive sense only and not for purposes of limitation. Descriptions of features or aspects within each embodiment should typically be considered as available for other similar features or aspects in other embodiments.

It will be understood that, although the terms "first", "second", "third", etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

In addition, it will also be understood that when a component is referred to as being "between" two components, it can be the only component between the two components, or one or more intervening components may also be present.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the inventive concept." Also, the term "exemplary" is intended to refer to an example or illustration.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", or "immediately adjacent" another element or layer, there are no intervening elements or layers present.

As used herein, the term "substantially," "about," and similar terms are used as terms of approximation and not as terms of degree, and are intended to account for the inherent variations in measured or calculated values that would be recognized by those of ordinary skill in the art.

As used herein, the terms "use," "using," and "used" may be considered synonymous with the terms "utilize," "utilizing," and "utilized," respectively.

The battery pack and/or any other relevant devices or components, such as the micro-controller and the protection IC, according to embodiments of the present invention described herein may be implemented utilizing any suitable hardware, firmware (e.g. an application-specific integrated circuit), software, or a suitable combination of software, firmware, and hardware. For example, the various components of the battery pack may be formed on one integrated circuit (IC) chip or on separate IC chips. Further, the various components of the battery pack may be implemented on a flexible printed circuit film, a tape carrier package (TCP), a printed circuit board (PCB), or formed on a same substrate. Further, the various components of the battery pack may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

While one or more embodiments have been described with reference to the figures, it will be understood by those of ordinary skill in the art that various changes in form and details may be made therein without departing from the spirit and scope as defined by the following claims and equivalents thereof.

What is claimed is:

1. A battery pack comprising:
  a battery comprising at least one battery cell;
  a terminal portion electrically connected to the battery and comprising a first pack terminal configured to be connected to an external load and a second pack terminal;
  a first switch configured to switch a discharge current of the battery according to a first control signal;
  a second switch configured to open or close according to a second control signal, and to open the first switch that is turned on by the first control signal by applying a voltage of-the first pack terminal or the second pack terminal to the first switch; and
  a battery manager configured to output the first control signal and the second control signal,
  wherein the battery manager comprises:
    a protection integrated circuit (IC) configured to sense a voltage of the battery and to output the first control signal; and
    a micro-controller configured to output the second control signal.

2. A battery pack comprising:
  a battery comprising at least one battery cell;
  a terminal portion electrically connected to the battery and comprising a first pack terminal connected to an external load and a second pack terminal;
  a first switch configured to switch a discharge current of the battery according to a first control signal;
  a second switch configured to open or close according to a second control signal, and to open the first switch that is turned on by the first control signal by a voltage of the first pack terminal or the second pack terminal; and
  a battery manager configured to output the first control signal and the second control signal,
  wherein the battery manager is configured to output, as the second control signal, a pulse width modulation signal having a pulse width varying according to a duty cycle.

3. The battery pack of claim 2, wherein the battery manager is configured to limit an amount of a discharge current of the battery by outputting the second control signal having a preset first duty cycle at a discharge start point when discharge starts.

4. The battery pack of claim 3, wherein the discharge start point is a point in time when an electric connection of the external load is sensed between the first pack terminal and the second pack terminal, or when the external load is electrically connected between the first pack terminal and the second pack terminal according to a start signal applied from the outside.

5. The battery pack of claim 4, wherein the battery manager is configured to output the second control signal having the preset first duty cycle and to then reduce the duty cycle of the second control signal.

6. A vacuum cleaner comprising:
  a battery pack;
  a capacitor electrically connected to the battery pack; and
  a motor connected in parallel to the capacitor,
  wherein the battery pack comprises:
    a battery comprising at least one battery cell;
    a first pack terminal and a second pack terminal electrically connected to the battery, and configured to be electrically connected to the capacitor and the motor;
    a first switch configured to switch a discharge current of the battery according to a first control signal;
    a second switch configured to open or close according to a second control signal, and to open the first switch that is turned on by the first control signal by applying a voltage of the first pack terminal or the second pack terminal to the first switch; and
    a battery manager configured to output the first control signal and the second control signal.

7. The vacuum cleaner of claim 6, wherein the battery manager is configured to output, as the second control signal, a pulse width modulation signal having a pulse width varying according to a duty cycle.

8. The vacuum cleaner of claim 7, wherein the battery manager is configured to reduce an amount of an inrush current that is a current initially flowing into the capacitor, by outputting the second control signal having a preset first duty cycle at a discharge start point when the battery starts discharging.

9. The vacuum cleaner of claim 8, wherein the battery manager is configured to output the second control signal having the preset first duty cycle and then to gradually reduce the duty cycle of the second control signal.

* * * * *